Aug. 6, 1968  E. KUGLER  3,395,622
SATCHEL BOTTOM BAG MANUFACTURE
Filed May 1, 1967  2 Sheets-Sheet 1
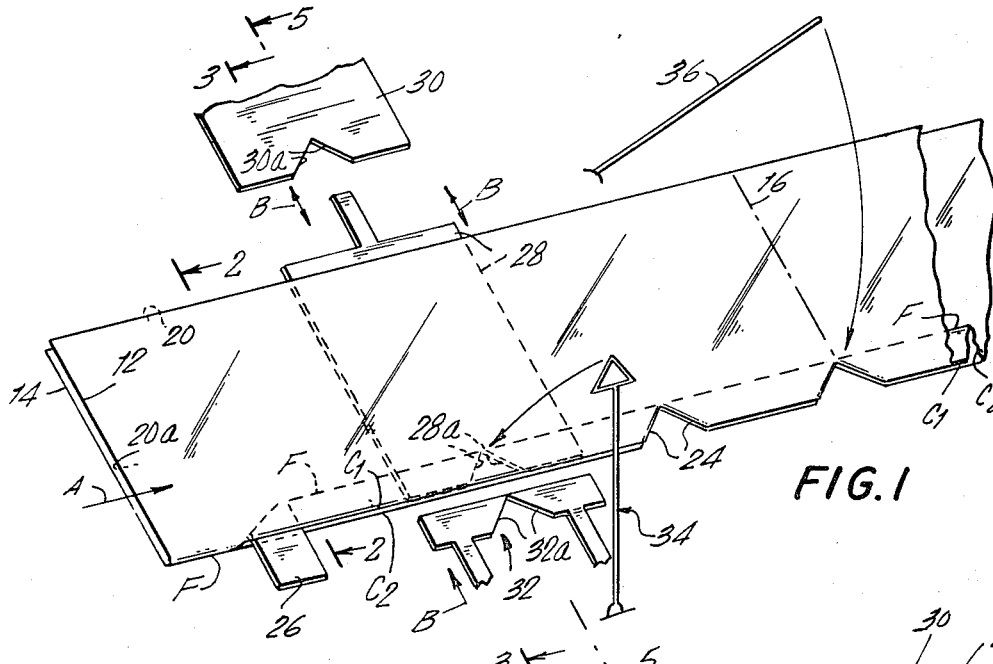
FIG. 1
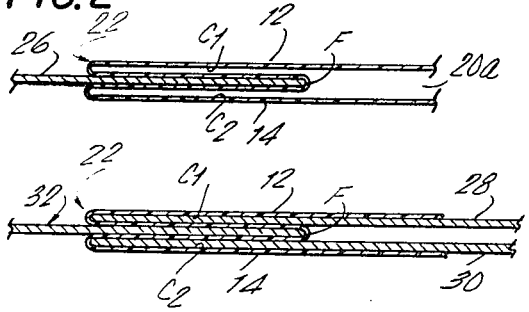
FIG. 2
FIG. 3
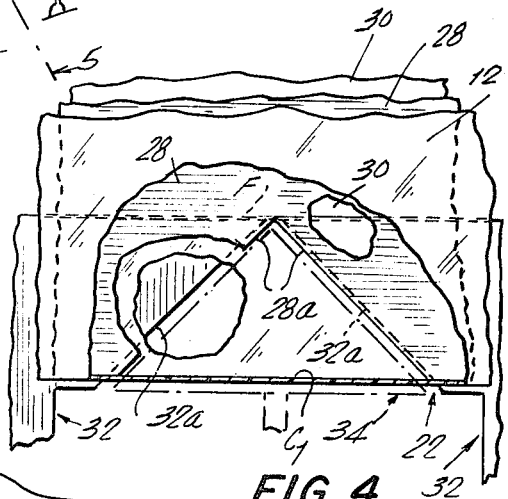
FIG. 4
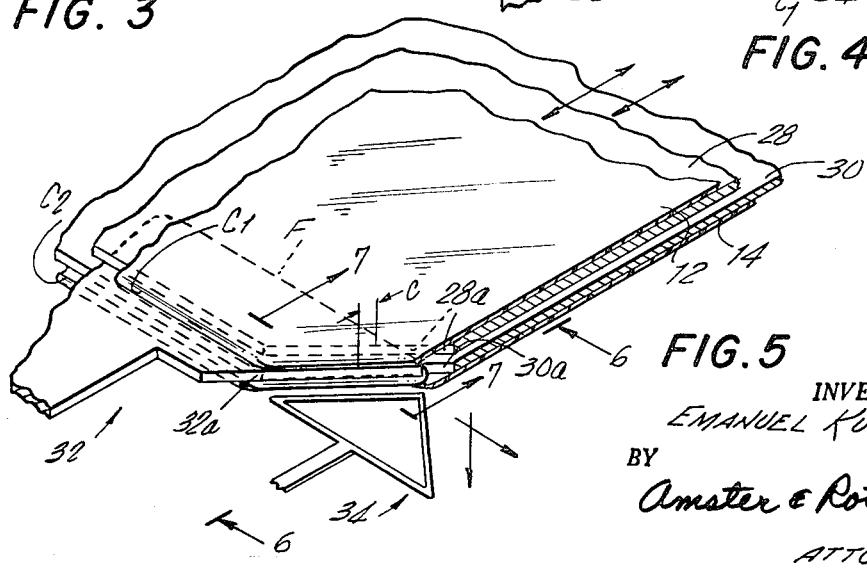
FIG. 5
INVENTOR.
EMANUEL KUGLER
BY
Amster & Rothstein
ATTORNEYS Aug. 6, 1968  E. KUGLER  3,395,622
SATCHEL BOTTOM BAG MANUFACTURE
Filed May 1, 1967  2 Sheets-Sheet 2
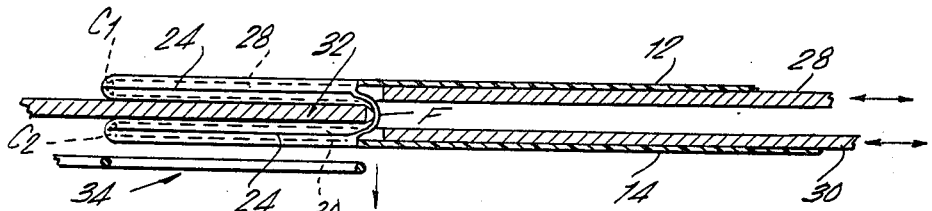
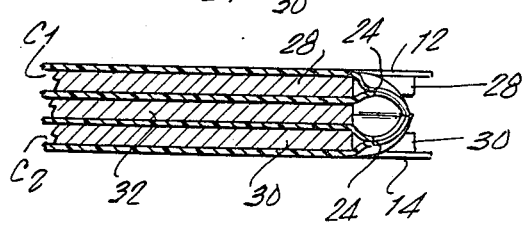
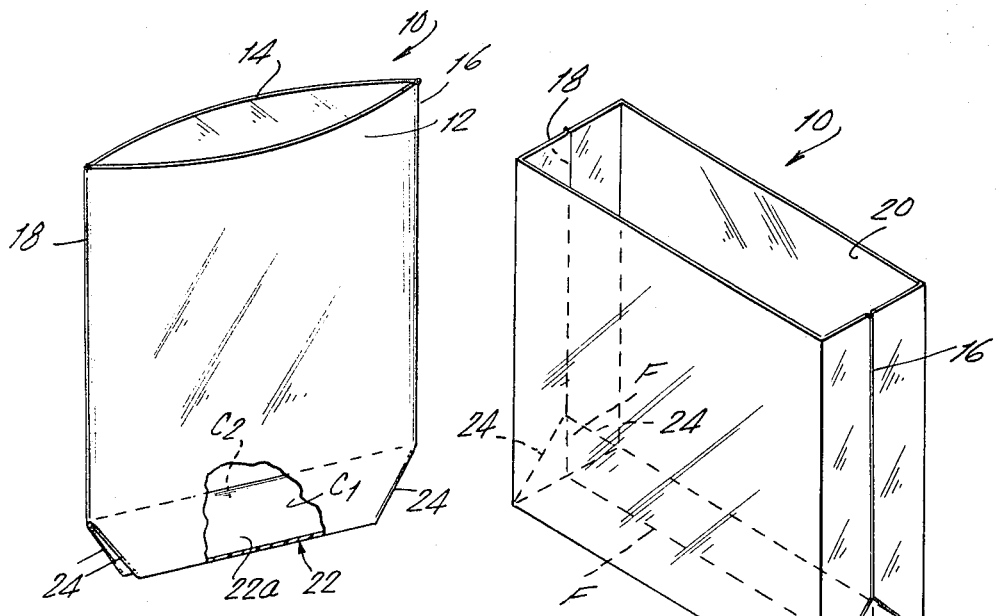
INVENTOR.
EMANUEL KUGLER
BY Amster & Rothstein
ATTORNEYS

United States Patent Office 3,395,622
Patented Aug. 6, 1968

3,395,622
SATCHEL BOTTOM BAG MANUFACTURE
Emanuel Kugler, 124 Richmond Place,
Lawrence, N.Y. 11559
Filed May 1, 1967, Ser. No. 635,085
3 Claims. (Cl. 93—35)

ABSTRACT OF THE DISCLOSURE

A method of mass producing plastic bags wherein for each bag the segregated compartments of a bottom gusset are held apart during the heat sealing and thus formation of the side edges thereon which, with a forty-five degree orientation to said side edges, produces a desirable so-called satchel bottom on each bag.

---

The present invention relates generally to plastic bag manuafcture and more particularly to the economical mass production of plastic bags having a satchel bottom providing a neat appearing square shape to the bags when filled.

In the packaging or bagging of bulky products, of which bread is a prime example, it is desirable that the filled bag have a neat, shape-conforming appearance. In the case of bread, this desired shape is, more particularly, square or rectangular and can be provided with a so-called satchel bottom construction, as is commonly provided on paper bags. However, known techniques of applying this construction to paper bags cannot be used in the production of plastic bags without seriously detracting from and interfering with the efficiency of production or unduly increasing the costs of production.

Broadly, it is an object of the present invention to provide a method of forming satchel bottom plastic bags which lends itself to economical mass production and which otherwise overcomes the noted and other shortcomings that result in using paper bag manufacturing techniques in the production of this type of plastic bag. Specifically, it is an object to provide a method of bag manufacturing which contemplates an on machine handling of the plastic which provides a satchel bottom construction and which is nevertheless compatible with high production at low cost.

An exemplary method of plastic bag manufacture demonstrating objects and advantages of the present invention includes feeding the plastic as an elongated folded two-ply configuration to which there is provided a bottom gusset having two segregated compartments, supporting each said compartment while interposing an operative member therebetween, and then heat sealing forty-five degree inclined side edges along the segregated compartments to thereby complete the construction of the gusset. Since the gusset compartments are held apart by the operative member they remain unconnected and are thus free to unfold, when the bag is filled, into a neat appearing, generally square bottom.

The above brief description, as well as further objects, features and advantages of the present invention, will be more fully appreciated by reference to the following detailed description of a presently preferred, but nonetheless illustrative, method in accordance with the present invention, when taken in conjunction with the accompanying drawings, wherein:

FIG. 1 is a perspective view illustrating the production of satchel bottom bags in accordance with the present invention;

FIGS. 2 and 3 are sectional views, on an enlarged scale, taken respectively on lines 2—2 and 3—3 of FIG. 1, illustrating the condition of the plastic material at successive feed positions thereof;

FIG. 4 is an enlarged plan view illustrating further details of the condition of the material and of exemplary apparatus for practicing the method hereof, portions of the material and of the apparatus being broken away to better illustrate further details thereof;

FIG. 5 is a perspective view, taken on line 5—5 of FIG. 1, specifically illustrating the manner in which a forty-five degree inclined side weld is applied to a bottom gusset while maintaining the two compartments of the gusset separated and unconnected to each other;

FIGS. 6 and 7 are sectional views taken respectively along lines 6—6 and 7—7 of FIG. 5 showing further details; and FIGS. 8 and 9 are perspective views of a typical satchel bottom bag produced according to the method hereof, FIG. 8 illustrating said bag in its folded condition and FIG. 9 in its unfolded condition.

Reference is now made to the drawings, and in particular to FIGS. 8 and 9, illustrating a typical satchel bottom bag, generally designated 10, which is produced by the method of the present invention. The bag 10 includes a pair of front and rear walls 12 and 14 joined to each other by side heat seals or welds 16 and 18. Bag 10 further includes a usual top opening 20 into its interior 20a and a bottom gusset construction 22 formed by a bottom wall 22a folded in half along a fold line F occupying an interposed position between the lower portions of the front and rear walls 12, 14. More particularly, each half of the wall 22a and the respective portions of the front and rear walls 12 and 14 which overlie the folded bottom wall 22a form segregated gusset compartments C1 and C2 on opposite sides of the fold line F, as clearly shown in FIG. 8. Each of these gusset compartments C1, C2, in turn, has opposite forty-five degrees inclined side edges, herein individually and collectively designated 24, which join the folded halves of the bottom wall 22a to the lowermost portions of the walls 12, 14 but which are free of any connection to each other. As a consequence, in practice, the bottom gusset 22 unfolds from its folded condition as illustrated in FIG. 8 into the unfolded condition 23 illustrated in FIG. 9 which provides a desirable square bottom to the bag 10.

Attention is now directed to FIG. 1 which illustrates an exemplary step-by-step procedure according to the present invention for mass producing the bags 10. More particularly, heat sealable plastic from a suitable supply roll is moved, by conventional bag manufacturing equipment which includes a conveyor, in a machine direction A. The plastic material at this early stage is in an elongated configuration presenting two plies 12 and 14 which, as should be readily understood, ultimately are formed into the front and rear walls of the individual bags 10. It should be similarly readily understood that the plies 12 and 14 form along one edge what is ultimately the top bag opening 20 and, along the opposite edge, has the previously noted gusset fold line F.

Still referring to FIG. 1, the first significant step of the method hereof consists of the fold line F being projected by a conventional gusset-forming member 26 into an interposed position between the plies 12 and 14. This, in turn, produces the two segregated gusset compartments C1, C2 along what is ultimately the bottom of each bag 10. In accordance with the method of the present invention, the feed movement of the plastic in the machine direction A is intermittent in that the plastic is advanced a bag width at a time and, between each such advancement, there is an interval during which the previously noted gusset side welds 24 are formed at opposite sides of the compartments C1 and C2.

During the interval of non-movement of the plastic, a cooperating pair of bag-forming members 28 and 30 is moved in a transverse direction B through the opening 20 between the plies 12 and 14 and into operative positions wherein the respective lower portions of each of the members are within the gusset compartments C1, C2, as clearly shown in FIG. 3. In one exemplary apparatus for practicing the method hereof, simultaneously with the movement of the bag-forming members 28, 30 into the compartments C1, C2, an operative member 32 is also moved transversely into an interposed position between the lower portions of the members 28, 30 and thus between the compartments C1, C2. Alternatively, the member 32 can be stationarily mounted downstream of the gusset-forming member 26 in its extending position interposed between the gusset compartments C1, C2. In either case, this results in a sandwiched condition of apparatus and plastic material, as best illustrated again in FIG. 3, in which the gusset compartments C1 and C2 are respectively supported by the members 28 and 30 while the member 32 occupies an interposed position between these gusset compartments and is thus instrumental in preventing these gusset compartments from being heat sealed to each other during the formation of the previously noted gusset side welds 24.

The ability of the member 32 to prevent all four layers of the plastic from being heat sealed to each other during the application of the heat seal or welds 24 is, of course, attributable to the interposed position of the member 32 between the two gusset compartments C1 and C2. Additionally, it should be noted that, in the sandwiched condition of the member 32 between the members 28 and 30, forty-five degree angled edges 32a on this member are adapted to align with similarly angled edges 28a and 30a of the bag-forming members and that further, and most significant to the method hereof, each edge 32a extends a slight distance C beyond its cooperating pair of aligned edges 28a, 30a. As a consequence, when a generally triangular heat sealing member 34, such as is diagrammatically illustrated in the drawings, having a pair of heat sealing edges describing a forty-five degree angle therebetween, is moved perpendicularly through the triangular openings defined by the edges 28a of member 28, the edges 32a of member 32, and finally the edges 30a of member 30, this movement of the heat sealing member 34 occurs adjacent the edges 32a but at the previously noted distance C from the other edges 28a, 30a. As best shown in FIG. 6, the two walls of the upper compartment C1 thus must make physical contact with each other in the clearance space C beyond the edge 28a thereby producing the upper gusset side weld 24. Similarly, continued movement of the heat sealing member 34 past the member 30 results in the production of the lower gusset side weld 24 joining the two walls of the gusset compartment C2 to each other, this again being the result of physical contact of these two walls in the clearance space C beyond the edge 30a. However, as is also clearly illustrated in FIG. 6, there is no physical contact between any layers of plastic bridging the gap between the upper and lower heat seals 24 but, rather, the movement of the heat sealing member 34 in close proximity past the edge 32a results in a shearing and removal of plastic material in the area that would otherwise bridge this gap between the upper and lower heat seals or welds 24. As a consequence, the gusset compartments C1 and C2 remain unattached to each other during the application of the gusset side welds 24.

Again, referring specifically to FIG. 1, after the heat sealing step achieved by heat sealing movement of the heat sealing member 34, there is produced a V-shaped notch in the gusset compartments C1, C2. Next, the bag-forming members 28 and 30 are withdrawn, at least in back of the fold line F which clears the edges 28a, 30a of these members from the partially completed gusset construction 22. Thereafter, the elongated plastic strip is indexed through further feed movement which ultimately moves the V-shaped notches bounded by the gusset side welds 24 adjacent a conventionally operated side weld producing member 36, diagrammatically illustrated in FIG. 1. Operating in a well understood manner, the member 36 is moved in a heat sealing stroke through the plastic material and successively applies the bag side welds 16 and 18.

In the foregoing description, the apparatus for practicing the method hereof should be readily familiar to those versed in the art and therefore this apparatus is illustrated diagrammatically and without showing such conventionally auxiliary equipment as air motors or the like which will be understood to power the moving parts. In other respects, as well, a latitude of modification, change and substitution is intended in the foregoing disclosure and in some instances some of the steps of the method hereof will be employed in a different sequence and without a corresponding use of other steps. Accordingly, it is appropriate that the appended claims be construed broadly and in a manner consistent with the spirit and scope of the invention herein.

What is claimed is:

1. A method of continuously forming bags having a satchel bottom for heat sealable plastic comprising the steps of feeding said plastic from a supply roll in a machine direction as an elongated folded configuration, said folded configuration having opposite elongated sides therealong of which one side defines top edges bounding an opening therebetween and the other side a bottom edge forming the bottom of said bags to be produced from said folded configuration, forming a gusset having two segregated compartments along said bottom edge, moving at least two bag-forming members in a direction transverse to said machine direction between said top edges into operative locations respectively supporting each of saich segregated compartments, said bag-forming members having at least one pair of aligned edges thereon oriented at substantially a forty-five degree angle to said gusset, maintaining said segregated compartments apart from each other with an operative member having an interposed position between said bag-forming members and said segregated compartments, said operative member having an edge similarly oriented at substantially a forty-five degree angle to said gusset aligning with said pair of bag-forming aligned edges and extending slightly therebeyond, and moving a heat sealing means, having a pair of heat sealing edges describing a forty-five degree angle therebetween, perpendicularly through said gusset past said extending edge of said operative member so as to produce forty-five degree inclined side edges on each of said segregated compartments while said segregated compartments remain separated from each other by said operative member and thereby unconnect to each other.

2. A method of forming satchel bottom bags as defined in claim 1 wherein said bag-forming members and said operative member each have a pair of forty-five degree angled edges such that during movement of said heat sealing means through said gusset the leading and trailing inclined side edges are applied to successively produced bags.

3. A method of forming satchel bottom bags as defined in claim 1 wherein said operative member is operatively arranged to be reciprocated transversely to said machine direction between a clearance position and said interposed position between said gusset compartments.

References Cited

UNITED STATES PATENTS

| 3,010,005 | 11/1961 | Sjostrom | 156—515 |
| 3,023,679 | 3/1962 | Piazze | 93—35 |
| 3,105,417 | 10/1963 | Hammer | 93—35 |
| 3,319,540 | 5/1967 | Stengle | 93—35 |

FOREIGN PATENTS 684,890  12/1952  Great Britain.

W. A. MORSE, JR., *Primary Examiner.*